(12) United States Patent
Ito et al.

(10) Patent No.: US 8,077,421 B1
(45) Date of Patent: Dec. 13, 2011

(54) POLE MISMATCH COMPENSATION VIA FEEDBACK CONTROL APPROACH

(75) Inventors: Kiyotada Ito, Hiratsuka (JP); Takahiro Inoue, Chigasaki (JP)

(73) Assignee: Marvell International Ltd., Hamilton (BM)

( * ) Notice: Subject to any disclaimer, the term of this patent is extended or adjusted under 35 U.S.C. 154(b) by 346 days.

(21) Appl. No.: 12/353,441

(22) Filed: Jan. 14, 2009

Related U.S. Application Data

(60) Provisional application No. 61/022,628, filed on Jan. 22, 2008.

(51) Int. Cl.
  *G11B 15/46* (2006.01)
  *H02P 5/00* (2006.01)
  *H02P 6/00* (2006.01)
  *H02P 6/16* (2006.01)

(52) U.S. Cl. ............... 360/73.03; 318/400.35; 388/800

(58) Field of Classification Search .................. None
See application file for complete search history.

(56) References Cited

U.S. PATENT DOCUMENTS

| 7,227,321 | B1 | 6/2007 | Rana et al. | |
| 7,573,214 | B1 * | 8/2009 | Sutardja et al. | 318/268 |
| 7,893,643 | B2 * | 2/2011 | Bonvin | 318/561 |

* cited by examiner

*Primary Examiner* — Daniell L Negron

(57) ABSTRACT

A system including an error signal generating module to generate an error signal based on (i) back electromotive force sensed from a motor and (ii) a predetermined speed of the motor. The error signal includes noise due to mismatched poles of the motor. A noise elimination module eliminates components of the noise having frequencies N times a frequency of rotation of the motor from the error signal and generates a corrected error signal, where N is an integer greater than or equal to zero. A control module generates a first control signal based on components of the corrected error signal, generates a second control signal based on components of the error signal, and rotates the motor at the predetermined speed based on (i) the first control signal and (ii) the second control signal. The components of the corrected error signal have higher frequencies than the components of the error signal.

17 Claims, 17 Drawing Sheets

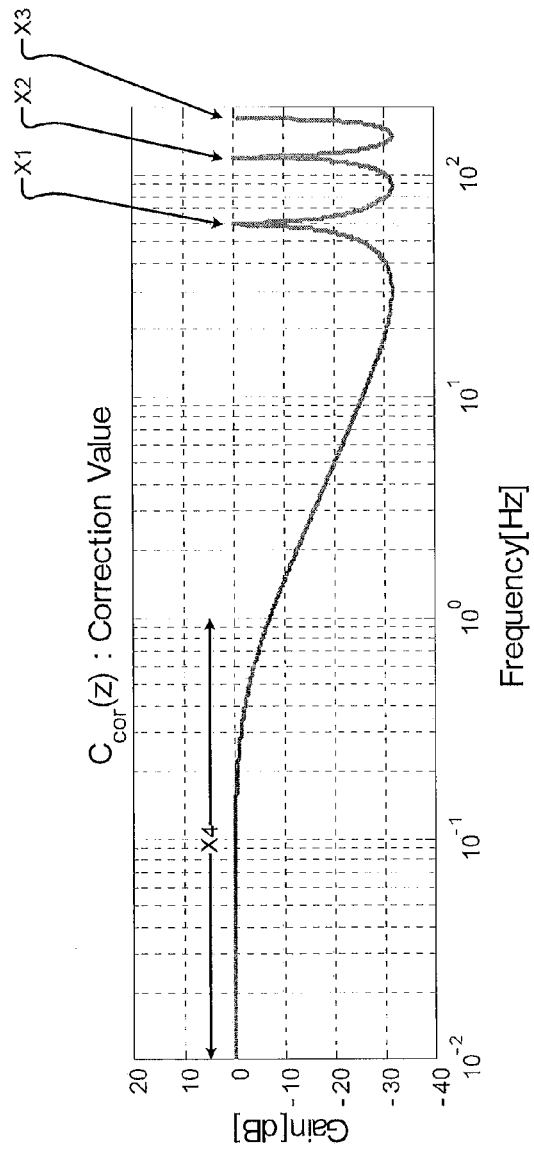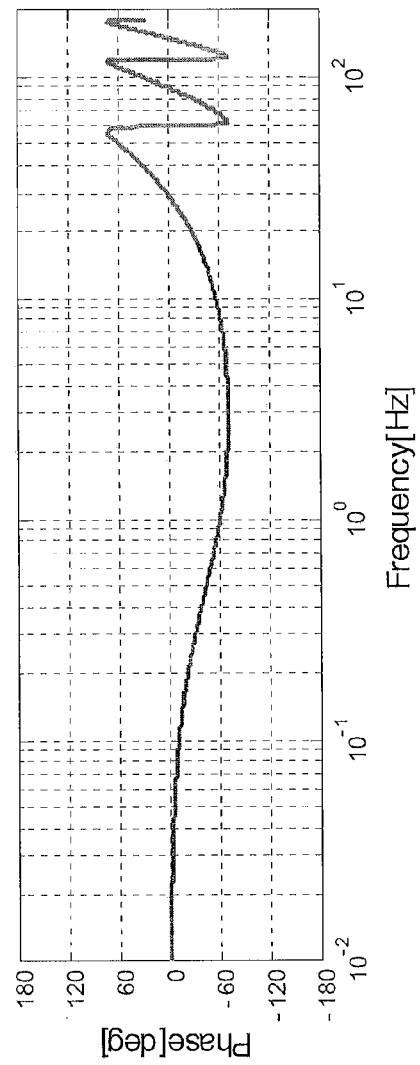
FIG. 6A
FIG. 6B

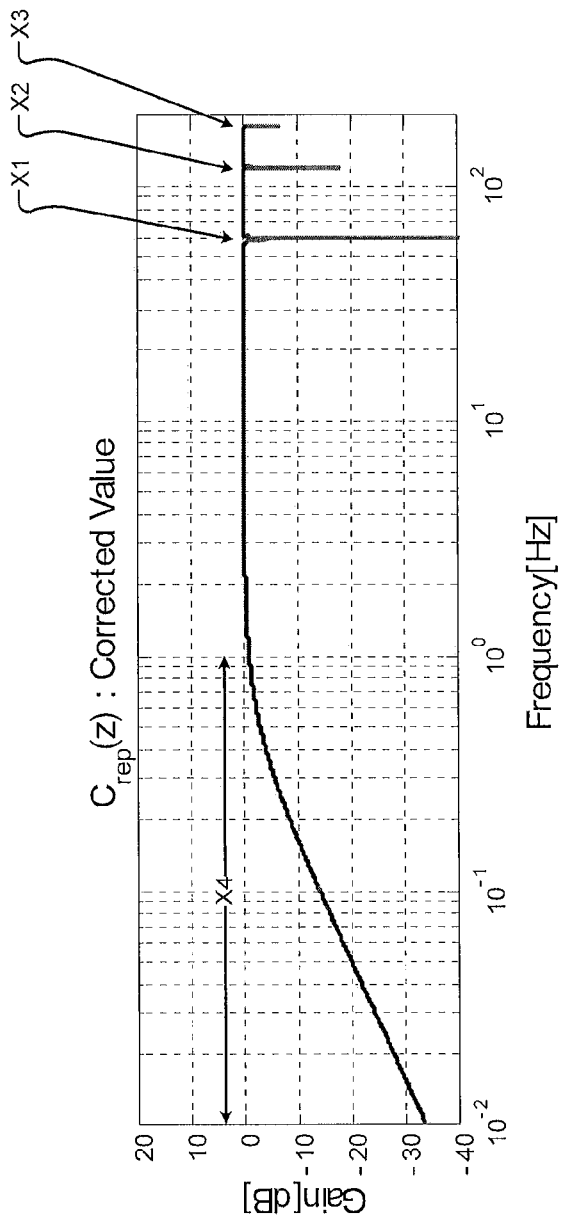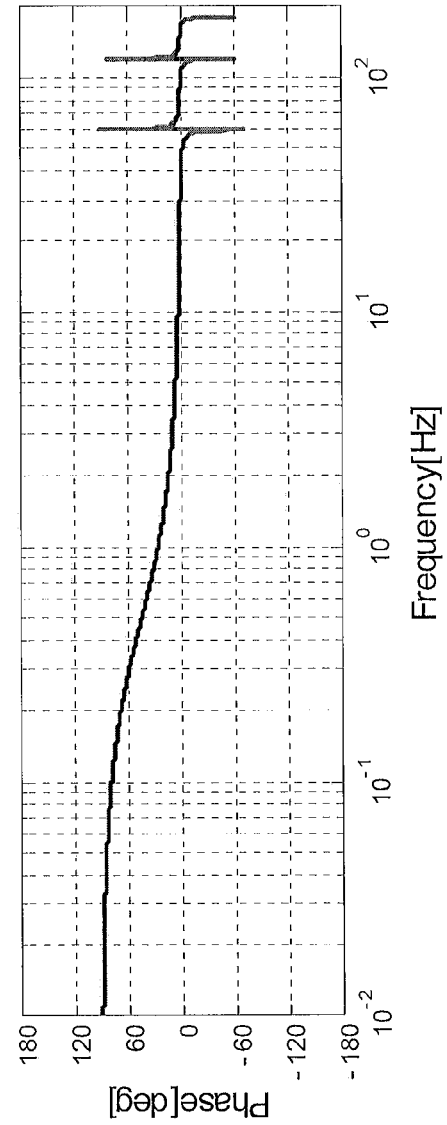
FIG. 7A
FIG. 7B

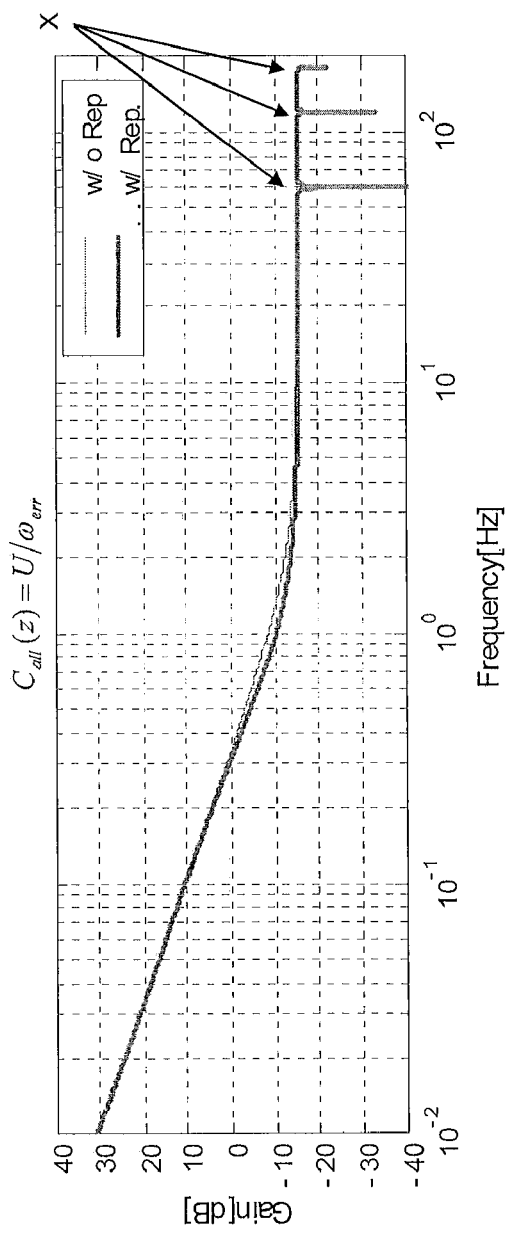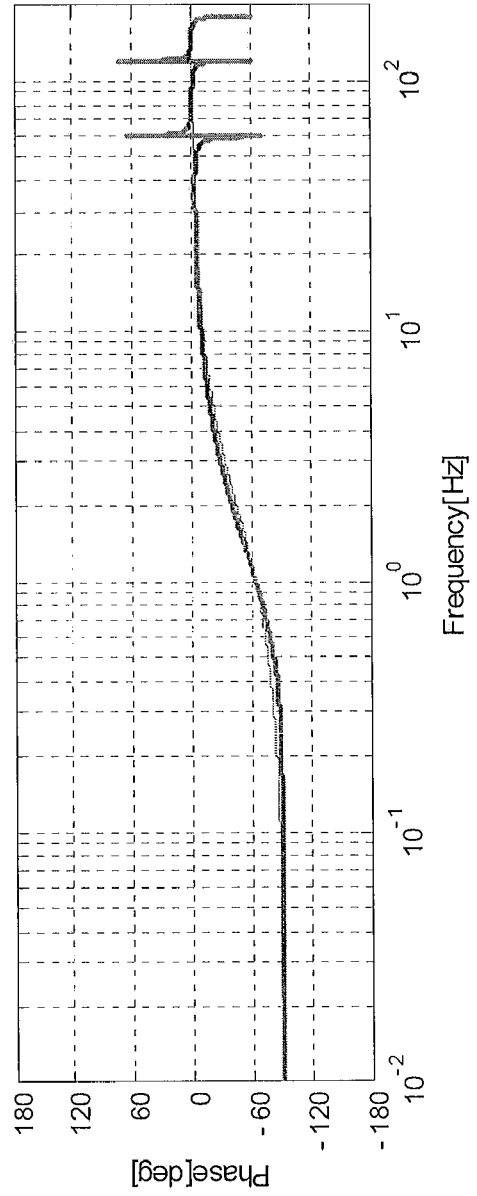
FIG. 9A
FIG. 9B

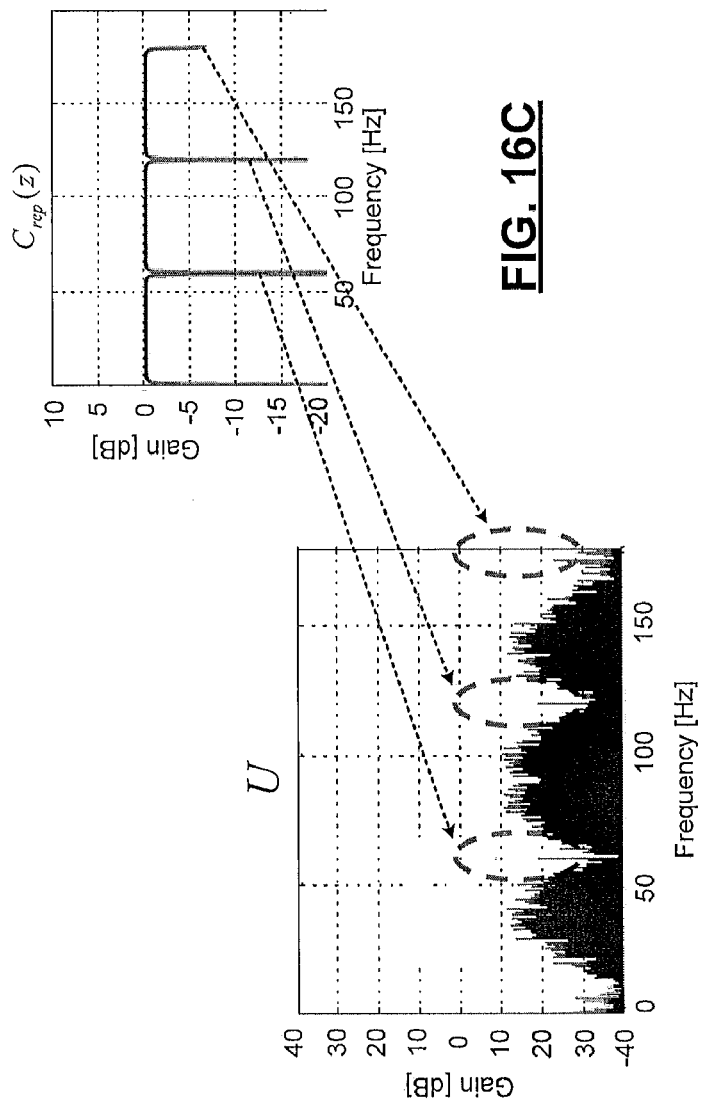
FIG. 16C
FIG. 16B
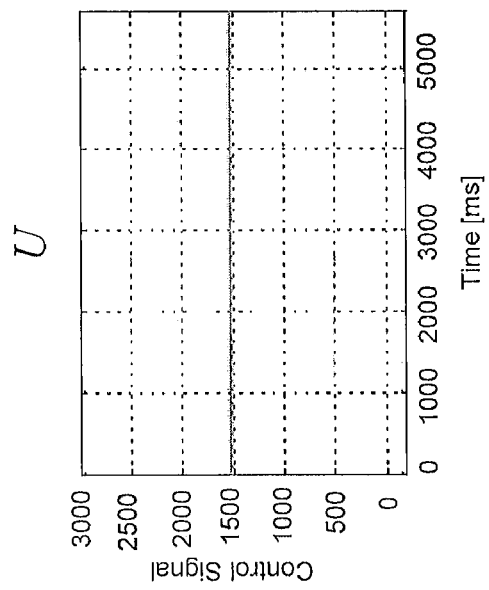
FIG. 16A

POLE MISMATCH COMPENSATION VIA FEEDBACK CONTROL APPROACH

CROSS-REFERENCE TO RELATED APPLICATIONS

This application claims the benefit of U.S. Provisional Application No. 61/022,628, filed on Jan. 22, 2008. The disclosure of the above application is incorporated herein by reference in its entirety.

FIELD

The present disclosure relates to rotating storage devices, and more particularly to controlling speed of motors that rotate storage media of the rotating storage devices.

BACKGROUND

The background description provided herein is for the purpose of generally presenting the context of the disclosure. Work of the presently named inventors, to the extent the work is described in this background module, as well as aspects of the description that may not otherwise qualify as prior art at the time of filing, are neither expressly nor impliedly admitted as prior art against the present disclosure.

Rotating storage devices include hard disk drives (HDDs) and optical disc drives. Examples of optical disc drives include compact disc (CD) drives and digital versatile disc (DVD) drives. Data is stored on a magnetic medium in the HDDs. Data is stored on an optical disc (e.g., a CD or a DVD) in the optical disc drives. A spindle motor rotates the magnetic medium of the HDDs at a predetermined speed. A spindle motor rotates an optical disc of the optical disc drives at a predetermined speed. Although HDDs are used as examples only throughout the disclosure, the following discussion applies equally to optical disc drives.

Referring now to FIG. 1, a HDD 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element (e.g., an inductor) that generates a magnetic field and a read element (e.g., a magneto-resistive (MR) element) that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (RAN) channel (hereinafter, "read-channel") module 28.

The HDD PCB 14 includes the read-channel module 28, a hard disk controller (HDC) module 30, a processor 32, a spindleNCM driver module 34, volatile memory 36, nonvolatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindleNCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo information, which is stored on the platters 16, ensures that data is written to and read from correct locations on the platters 16. In some implementations, a self-servo write (SSW) module 42 may write servo information on the platters 16 using the heads 20 prior to storing data on the HDD 10.

SUMMARY

A system comprises an error signal generating module, a noise elimination module, and a control module. The error signal generating module generates an error signal based on back electromotive force sensed from a motor and a predetermined speed of the motor. The error signal includes noise due to mismatched poles of the motor. The noise elimination module generates a corrected error signal by eliminating components of the noise having frequencies N times a frequency of rotation of the motor from the error signal, where N is an integer greater than or equal to zero. The control module generates a first signal based on first components of the corrected error signal, generates a second signal based on second components of the error signal, and rotates the motor at the predetermined speed based on the first and second control signals. The first components have higher frequencies than the second components.

In other features, the systems and methods described herein are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings.

FIGS. 6A and 6B depict exemplary frequency characteristics of a transfer function $C_{cor}(z)$ of a repetitive compensation module of the noise eliminating module of FIG. 4.

FIGS. 7A and 7B depict exemplary frequency characteristics of a transfer function $C_{rep}(z)$ of the noise eliminating module of FIG. 4.

FIGS. 9A and 9B depict exemplary frequency characteristics of a transfer function $C_{all}(z)$ of the speed control module of FIG. 3.

FIGS. 16A-16C depict experimental results of the control signal U when the speed control module of FIG. 3 is used.

DESCRIPTION

Figure 1:
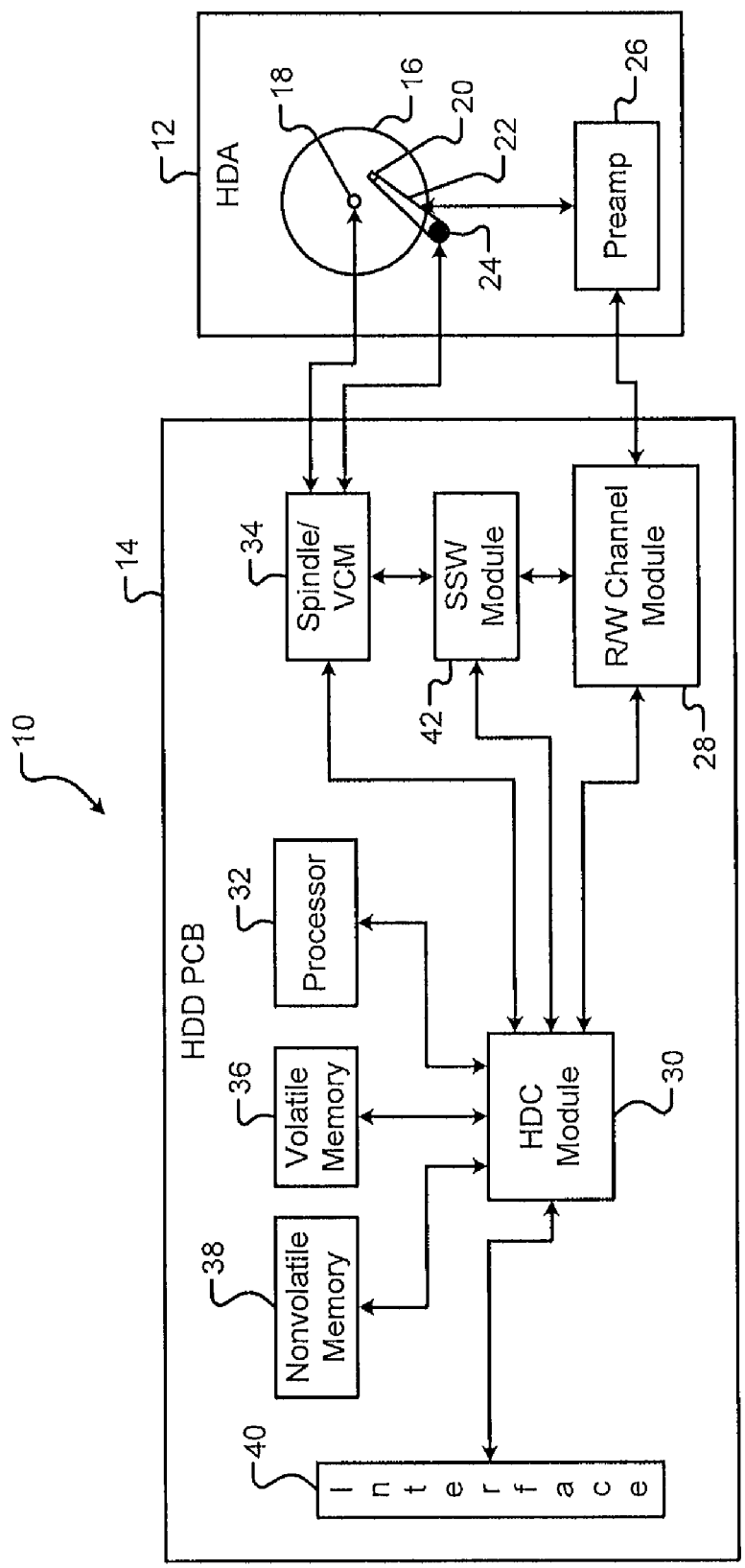
FIG. 1 is a functional block diagram of a hard disk drive (HDD).

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that one or more steps within a method may be executed in different order or concurrently without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Spindle motors typically include brushless direct current (DC) motors. A brushless DC motor includes a rotor having a plurality of magnetic poles and a stator having a plurality of drive coils. The magnetic poles having alternating polarities are typically positioned along the circumference of the rotor with approximately equal spacing.

A spindle driver module that drives the spindle motor detects the relative positions of the rotor and the stator. The spindle driver module selects a drive coil from the plurality of drive coils according to the detected relative positions. The spindle driver module supplies a drive current or a drive voltage to the selected drive coil. The drive coil generates a magnetic field having different phases. The magnetic field interacts with the magnetic poles of the rotor to rotate the spindle motor in a predetermined direction.

The spindle driver module receives a control signal designating a rotational speed (hereinafter speed) of the spindle motor from a speed control module. The spindle driver module adjusts the value of the drive voltage or the drive current based on the control signal to maintain the speed relatively constant.

The spindle driver module detects a back electromotive force (BEMF) from the drive coils that are not supplied with the drive current. The spindle driver module detects the relative positions of the stator and the rotor based on the detected BEMF. The spindle driver module generates a detection signal indicating the speed based on the BEMF and outputs the detection signal to the speed control module. Based on the detection signal, the speed control module generates the control signal that sets the speed of the spindle motor to a desired value (i.e., a desired speed).

Occasionally, the positions of the magnetic poles may deviate from the desired positions. The deviation in position of the magnetic poles is called pole mismatch. Due to the deviation (i.e., due to the pole mismatch), the BEMF detected from the drive coils may differ for each group of magnetic poles. Since the detection signal is generated based on the BEMF, the detection signal may include noise caused by the deviation (i.e., by the pole mismatch). When the detection signal includes the noise, the speed control module cannot accurately control the speed of the motor.

The present disclosure relates to a speed control system that uses feedback to compensate the noise generated by the pole mismatch. Although the spindle motor 18 is used as an example throughout the disclosure, the speed control system can be used to control speed of any brushless DC motor. For example, the speed control system can be used to control speed of motors that rotate optical discs of optical disc drives. Examples of optical disc drives include compact disc (CD) drives and digital versatile disc (DVD) drives.

Noise due to pole mismatch is synchronous with the frequency of rotation of the spindle motor. Accordingly, non-tracking repeatable controllers can be used to cancel the synchronous noise components. However, conventional non-tracking repeatable controllers also eliminate a DC component in addition to eliminating the synchronous components. Accordingly, a low-frequency controller and a high-frequency controller may be used in parallel. The high-frequency controller may generate a high-frequency control command based on a corrected error signal having no synchronous noise components. The low-frequency controller may generate a low-frequency control command based on an uncorrected or raw error signal that includes the DC component. Thus two control commands are combined to generate a control signal that is compensated for the noise generated due to the pole mismatch and that controls the speed of the spindle motor at the desired speed despite the pole mismatch.

Figure 2:
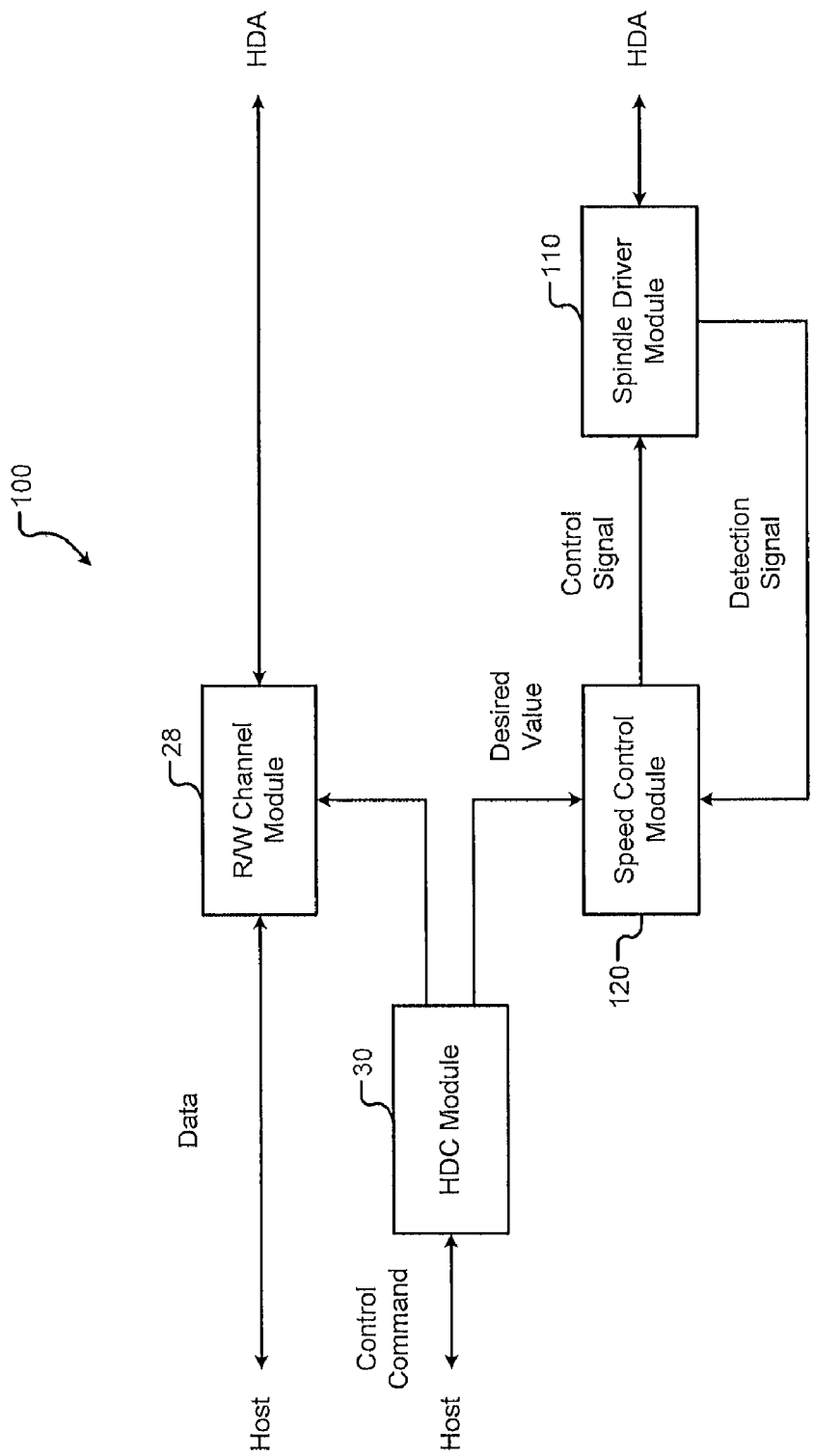
FIG. 2 is a functional block diagram of a speed control system that controls the speed of a spindle motor of the HDD of FIG. 1.

FIG. 2 illustrates an exemplary speed control system 100 that uses feedback to control the speed of a spindle motor (e.g., spindle motor 18 of FIG. 1). The system 100 comprises the spindle motor 18, a spindle driver module 110, the read-channel module 28, a speed control module 120, and the hard disk controller (HDC) module 30.

The spindle motor 18 may include a brushless DC motor. The spindle motor 18 may include a rotor having a plurality of magnetic poles (e.g., six poles) and a stator having a plurality of drive coils (all not shown). The magnetic poles having alternating polarities are typically positioned along the circumference of the rotor with approximately equal spacing. The drive coils of the stator apply a magnetic field having different phases (e.g., three phases) to the magnetic poles of the rotor.

The spindle driver module 110 drives the spindle motor 18. The spindle driver module 110 rotates the rotor of the spindle motor 18 by supplying a three-phase drive current or drive voltage to the plurality of drive coils of the spindle motor 18. The spindle driver module 110 detects the BEMF from the drive coils that are not supplied with the drive current or the drive voltage. The spindle driver module 110 detects the relative positions of the stator and the rotor based on the detected BEMF. The spindle driver module 110 selects a drive coil from the plurality of drive coils according to the detected relative positions. The spindle driver module 110 supplies the drive current or the drive voltage to the selected drive coil to rotate the spindle motor 18 in the predetermined direction at the desired speed.

The spindle driver module 110 receives a control signal designating the speed of the spindle motor 18 from the speed control module 120. The spindle driver module 110 changes the drive voltage or the drive current being supplied to the spindle motor 18 according to the control signal. Thus, the spindle driver module 110 can rotate the spindle motor 18 at the desired speed designated by the control signal. The spindle driver module 110 also generates a detection signal that indicates the speed of the spindle motor 18 based on the BEMF detected from the spindle motor 18. The spindle driver module 110 feeds back the detection signal to the speed control module 120.

The speed control module 120 controls the speed of the spindle motor 18 at the desired value. More specifically, the speed control module 120 receives the detection signal generated by the spindle driver module 110. The speed control module 120 calculates a difference between the desired value (i.e., the desired speed) and the value of the detection signal (i.e., a measured speed). The speed control module 120 generates a control signal to compensate for any difference between these two values. The speed control module 120 outputs the control signal to the spindle driver module 110, thereby bringing the speed of the spindle motor 18 gradually closer to the desired value.

Figure 3:
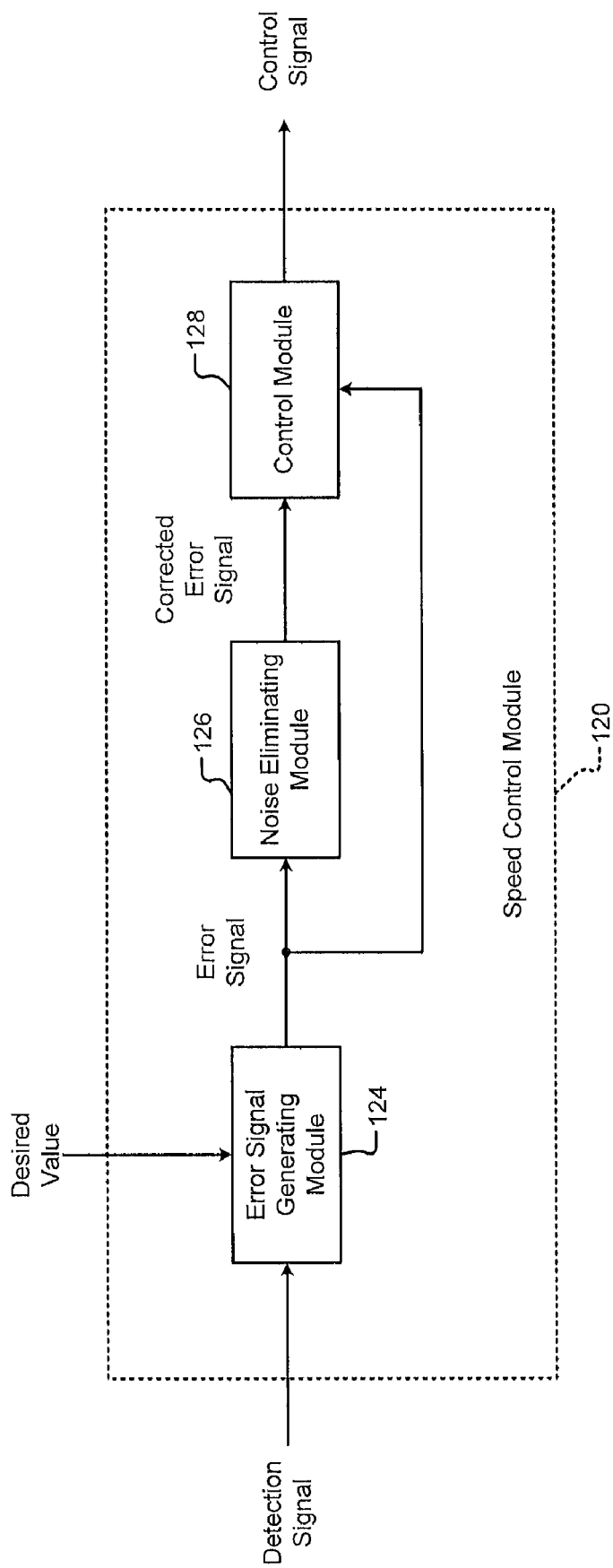
FIG. 3 is a functional block diagram of a speed control module of the speed control system of FIG. 2.

Referring now to FIG. 3, the speed control module 120 is shown in detail. The speed control module 120 controls the speed of the spindle motor 18, which is the target variable, close to the desired value. More specifically, the speed control module 120 receives the detection signal indicating the speed of the spindle motor 18 (i.e., the target variable) from the spindle driver module 110 (i.e., the target being controlled or the control target). The speed control module 120 generates the control signal that controls the speed of the spindle motor 18 based on the detection signal. The speed control module 120 outputs the control signal to the spindle driver module 110.

The speed control module 120 comprises an error signal generating module 124, a noise eliminating module 126, and a control module 128. The error signal generating module 124 receives the detection signal that indicates the measured speed of the spindle motor 18 from the spindle driver module 110. The error signal generating module 124 generates an error signal indicating a difference between the measured speed indicated by the detection signal and the desired speed. For example, the error signal generating module 124 generates the error signal by subtracting the measured speed from the desired speed. The error signal generating module 124 may receive the desired speed from the HDC module 30.

The noise eliminating module 126 receives the error signal from the error signal generating module 124. The noise eliminating module 126 generates a corrected error signal by eliminating noise components at specified frequencies from the error signal. The specified frequencies may include a frequency of rotation of the spindle motor 18 (hereinafter rotation frequency) and harmonics of the rotation frequency. The harmonics may include frequencies that are N times the rotation frequency, where N is an integer greater than 1.

The noise eliminating module 126 can eliminate a noise component superimposed on the error signal caused by the periodic operation of the control target (i.e., the rotation of the spindle motor 18). Additionally, the noise eliminating module 126 may remove from the error signal a non-noise component included in a frequency band outside the specified frequencies. For example, the noise eliminating module 126 may eliminate from the error signal the noise component and a frequency component that is zero times the rotation frequency (i.e., the DC component).

The spindle driver module 110 generates the detection signal indicating the speed of the spindle motor 18 based on the BEMF detected from the spindle motor 18. Since the error signal is generated based on the detection signal, the error signal includes noise caused by the pole mismatch. Ideally, the magnetic poles should be arranged along the circumference of the rotor with equal spacing. However, the magnetic poles may deviate from their intended positions, thereby generating noise. The noise due to the pole mismatch is superimposed on the error signal.

The noise is superimposed on the component of the error signal at the rotation frequency and the components of the error signal at the harmonics of the rotation frequency. By removing the component at the rotation frequency and the components at the harmonics from the error signal, the noise eliminating module 126 can remove the noise components superimposed on the error signal.

The noise eliminating module 126 eliminates from the error signal the signal components at frequencies that are N times the rotation frequency, where N is an integer greater than or equal to zero. Accordingly, the noise eliminating module 126 not only eliminates the noise component from the error signal but also eliminates a non-noise component, which is the component at a frequency that is zero times the rotation frequency (i.e., the DC component).

Figure 4:
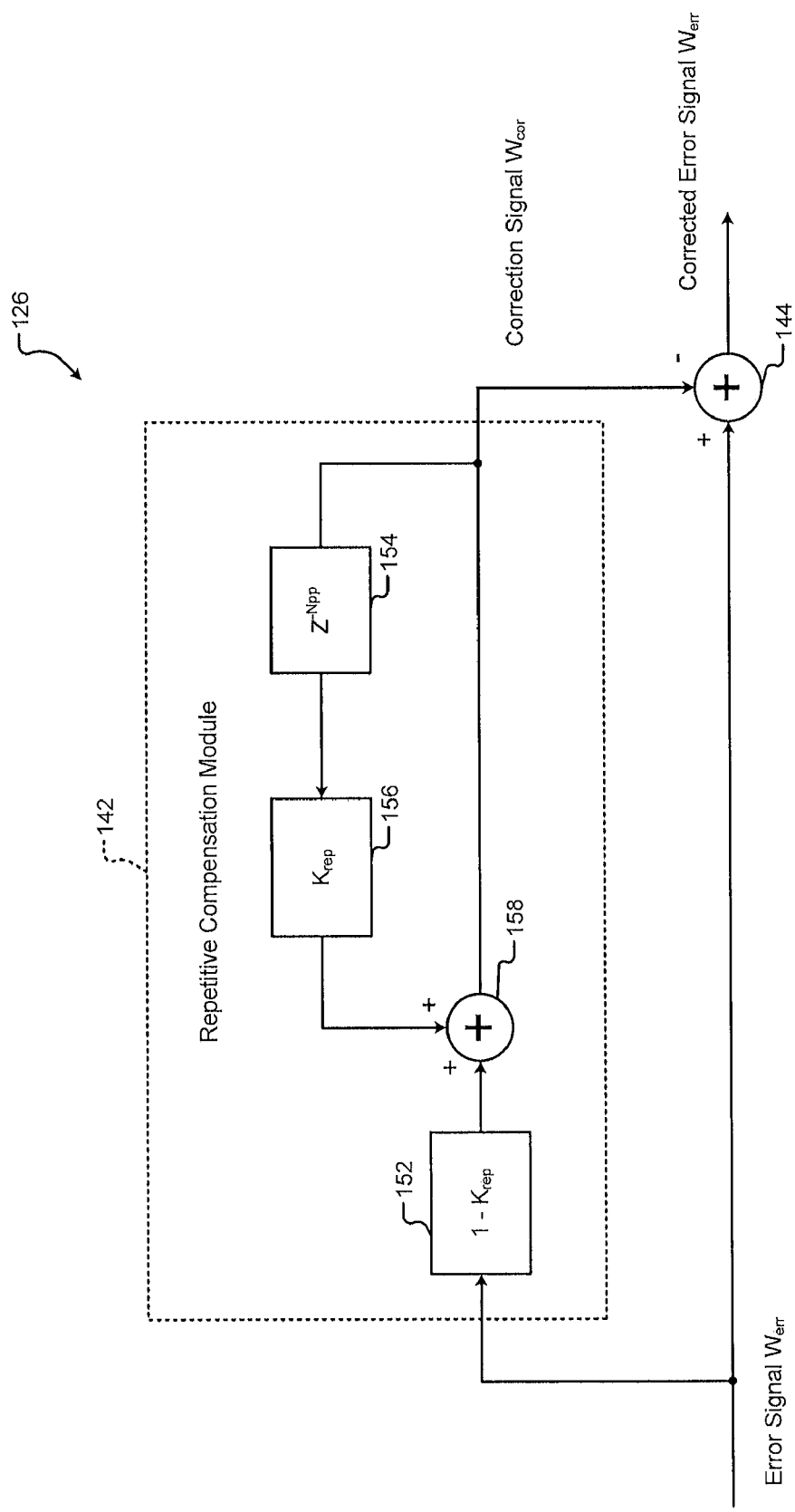
FIG. 4 is a functional block diagram of a noise eliminating module of the speed control module of FIG. 3.

Referring now to FIG. 4, the noise eliminating module 126 is shown in detail. The noise eliminating module 126 may comprise a repetitive compensation module 142 and a subtracting module 144. The repetitive compensation module 142 receives the error signal $\omega_{err}$ generated by the error signal generating module 124 by subtracting the detection signal from the desired speed. The repetitive compensation module 142 passes a specified frequency component of the error signal $\omega_{err}$. The repetitive compensation module 142 passes components of the error signal $\omega_{err}$ at frequencies that are N times the of the rotation frequency, where N is an integer greater than or equal to zero.

The repetitive compensation module 142 may pass the component of the specified frequency as follows. The component may be obtained by calculating a linear sum of the error signal $\omega_{err}$ and a delayed output of the repetitive compensation module 142. The delayed output is a signal called a correction signal $\omega_{cor}$ that is generated by delaying the output of the repetitive compensation module 142 by one cycle of the specified frequency (i.e., the rotation frequency of the spindle motor 18). In other words, the repetitive compensation module 142 passes the components of the rotation frequency and the frequency equal to an integer multiple of the rotation frequency, which are included in the error signal $\omega_{err}$.

The repetitive compensation module 142 may comprise a first proportioning module 152, a delay module 154, a second proportioning module 156, and an adding module 158. The first proportioning module 152 multiplies the error signal $\omega_{err}$ by a first proportionality constant $(1-K_{rep})$. The first proportionality constant $(1-K_{rep})$ may be greater than zero and less than one. The first proportionality constant $(1-K_{rep})$ may be obtained by subtracting a second proportionality constant $K_{rep}$ from one. The second proportionality constant $K_{rep}$ may be greater than zero and less than one.

The second proportionality constant $K_{rep}$ denotes a gain of the second proportioning module 156. The first proportionality constant $(1-K_{rep})$ denotes a gain of the first proportioning module 152. The first proportioning module 152 scales the error signal $\omega_{err}$ by the gain $(1-K_{rep})$. The second proportioning module 156 scales a delayed correction signal (i.e., a delayed $\omega_{cor}$) by the gain $K_{rep}$.

The delay module 154 delays the output of the repetitive compensation module 142 (i.e., the correction signal $\omega_{cor}$) by one cycle of the rotation frequency. For example, the delay module 154 may include a shift register that delays the correction signal $\omega_{cor}$ by a number of samples corresponding to one cycle of the rotation frequency.

The second proportioning module 156 multiplies the correction signal delayed by the delay module 154 (i.e., $\omega_{cor}^{-NPP}$) by the second proportionality constant $K_{rep}$. $\omega_{cor}^{-NPP}$ is the output of the repetitive compensation module 142 at a time that is one cycle of the rotation frequency of the spindle motor 18 earlier.

The adding module 158 generates the correction signal $\omega_{cor}$ by adding the output of the first proportioning module 152 and the output of the second proportioning module 156. Thus, the repetitive compensation module 142 passes the components of the rotation frequency and the frequency equal to an integer multiple of the rotation frequency, which are included in the error signal $\omega_{err}$.

In other words, the repetitive compensation module 142 can calculate the linear sum using the following equation.

$$\omega_{cor}(z)=((1-K_{rep})\times\omega_{err}(z))+(K_{rep}\times\omega_{cor}(z^{-NPP}))$$

where $\omega_{cor}(z^{-NPP})$ denotes a signal obtained by delaying $\omega_{cor}(z)$ by one cycle of the rotation frequency.

The subtracting module 144 subtracts the signal passed by the repetitive compensation module 142 (i.e., the correction signal $\omega_{cor}$) from the error signal $\omega_{err}$. The subtracting module 144 generates a corrected error signal $\omega^*_{err}$ by subtracting the correction signal $\omega_{cor}$ from the error signal $\omega_{err}$ and outputs the corrected error signal $\omega^*_{err}$ to the control module 128. Thus, the noise eliminating module 126 can generate the corrected error signal $\omega^*err$, which is obtained by eliminating from the error signal $\omega_{err}$ the signal components at the rotation frequency of the spindle motor 18 and at the frequencies equal to integer multiples of the rotation frequency.

Figure 5A:
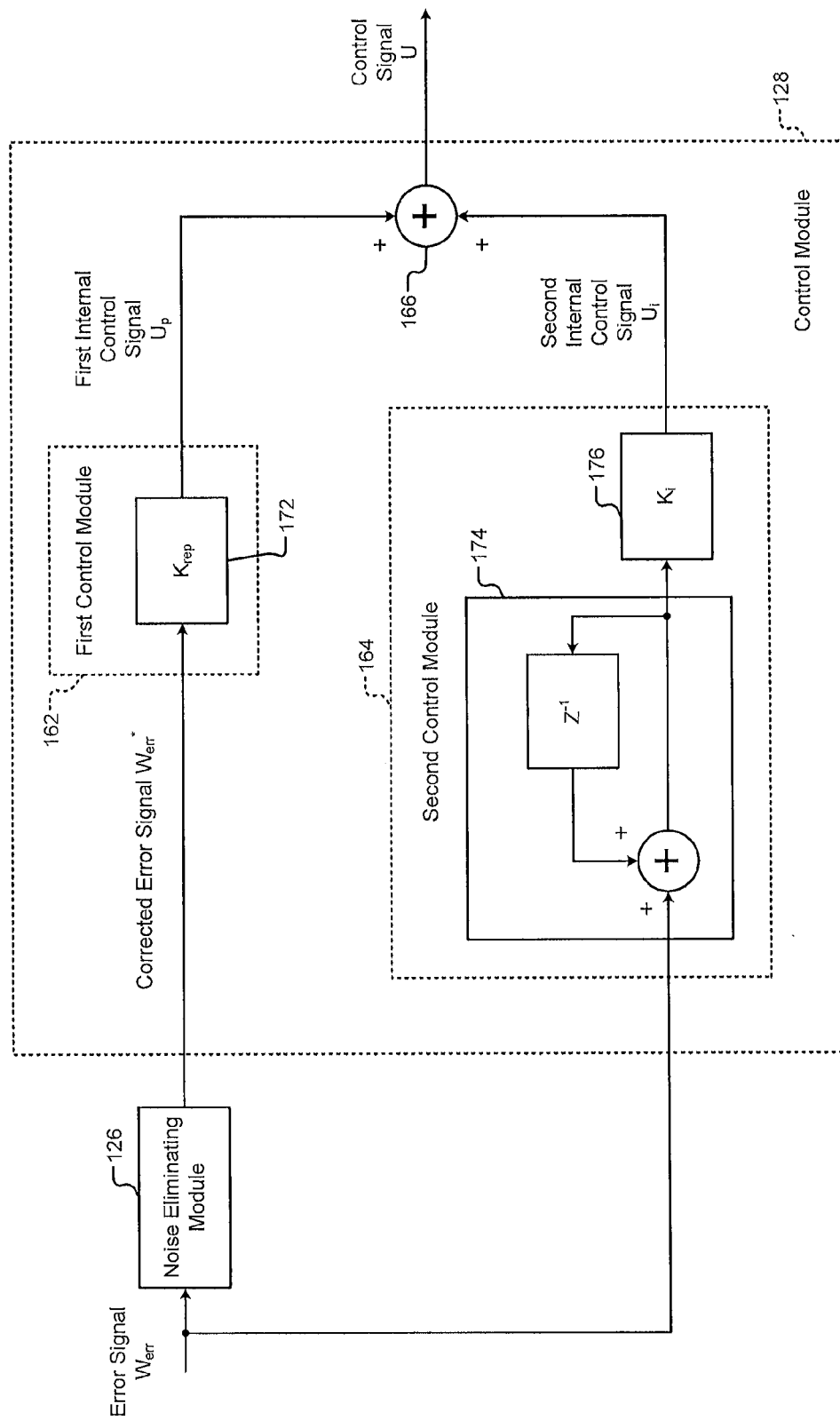
FIG. 5A is a functional block diagram of a control module of the speed control module of FIG. 3.

Referring now to FIG. 5A, an example of the control module 128 is shown. The control module 128 receives the corrected error signal from the noise eliminating module 126 and receives the error signal from the error signal generating module 124. The control module 128 generates the control signal that controls the speed of the spindle motor 18 based on the error signal and the corrected error signal. For example, the control module 128 may generate the control signal by individually compensating the error signal and the corrected error signal and by adding the resulting compensated signals. The control module 128 outputs the control signal to the spindle driver module 110.

The control module 128 may comprise a first control module 162, a second control module 164, and an adding module 166. The first control module 162 generates a first internal control signal $U_P$ based on the corrected error signal $\omega^*_{err}$ received from the noise eliminating module 126. For example, the first control module 162 generates the first internal control signal $U_P$ by performing a predetermined compensation on the corrected error signal $\omega^*_{err}$.

The second control module 164 generates a second internal control signal $U_I$ based on the error signal $\omega_{err}$ received from the error signal generating module 124. For example, the second control module 164 generates the second internal control signal $U_I$ by performing a predetermined compensation on the error signal $\omega_{err}$. The second control module 164 generates the second internal control signal $U_I$ based on a non-noise component of the error signal $\omega_{err}$, which is eliminated along with the noise component by the noise eliminating module 126. For example, the second control module 164 generates the second internal control signal $U_I$ by performing a predetermined compensation on the non-noise component of the error signal $\omega_{err}$. The adding module 166 generates a control signal U by adding the first internal control signal $U_P$ and the second internal control signal $U_I$.

Thus, the control module 128 outputs the control signal U that is generated by performing the predetermined compensation on the error signal $\omega_{err}$ from which only the noise component at the specified frequency is eliminated. For example, the control module 128 outputs the control signal U that is generated by performing the predetermined compensation on the error signal $\omega_{err}$ from which only the noise components that are superimposed at the rotation frequency and the harmonics (which are N times the rotation frequency) are eliminated.

The first control module 162 may comprise a high-pass filter, for example. The high-pass filter may eliminate a low-frequency band including the DC component from the corrected error signal $\omega^*_{err}$. The high-pass filter may pass a high-frequency band including the harmonics and the rotation frequency from the corrected error signal $\omega^*_{err}$.

The second control module 164 may comprise a low-pass filter, for example. The low-pass filter may pass the low-frequency band including the DC component from the error signal $\omega_{err}$. The low-pass filter may eliminate the high-frequency band including the harmonics and the rotation frequency from the error signal $\omega_{err}$.

The first control module 162 and the second control module 164 may include any suitable high-pass filter and low-pass filter, respectively. A gain of the second control module 164 may be sufficiently greater than a gain of the first control module 162 in the low frequency band. The gain of the first control module 162 may be sufficiently greater than the gain of the second control module 164 in the high frequency band.

For example, the first control module 162 may comprise a first proportioning module 172. The first proportioning module 172 may generate the first internal control signal $U_P$ by multiplying the corrected error signal $\omega^*_{err}$ by a proportionality constant $K_p$ of the first control module 162.

The second control module 164 may comprise an integrating module 174 and a second proportioning module 176. The integrating module 174 generates an integration value by integrating the error signal $\omega_{err}$. The second proportioning module 176 generates the second internal control signal $U_I$ by multiplying the integration value by a proportionality constant $K_i$ of the second control module 164. The adding module 166 generates the control signal U by adding the outputs of the first and second control modules 162, 164. The spindle driver module 110 drives the spindle motor 18 at the desired speed based on the control signal U.

Thus, the speed control module 120 uses feedback to eliminate noise caused by pole mismatch that is superimposed on the detection signal. The speed control module 120 generates the control signal to control the speed of the spindle motor 18 based on the error signal from which the noise component of the specified frequency is eliminated. By generating the control signal in this manner, the speed control module 120 removes the effect of the periodic disturbance from the control signal, thereby maintaining the speed of the spindle motor 18 at the desired speed.

Figure 5B:
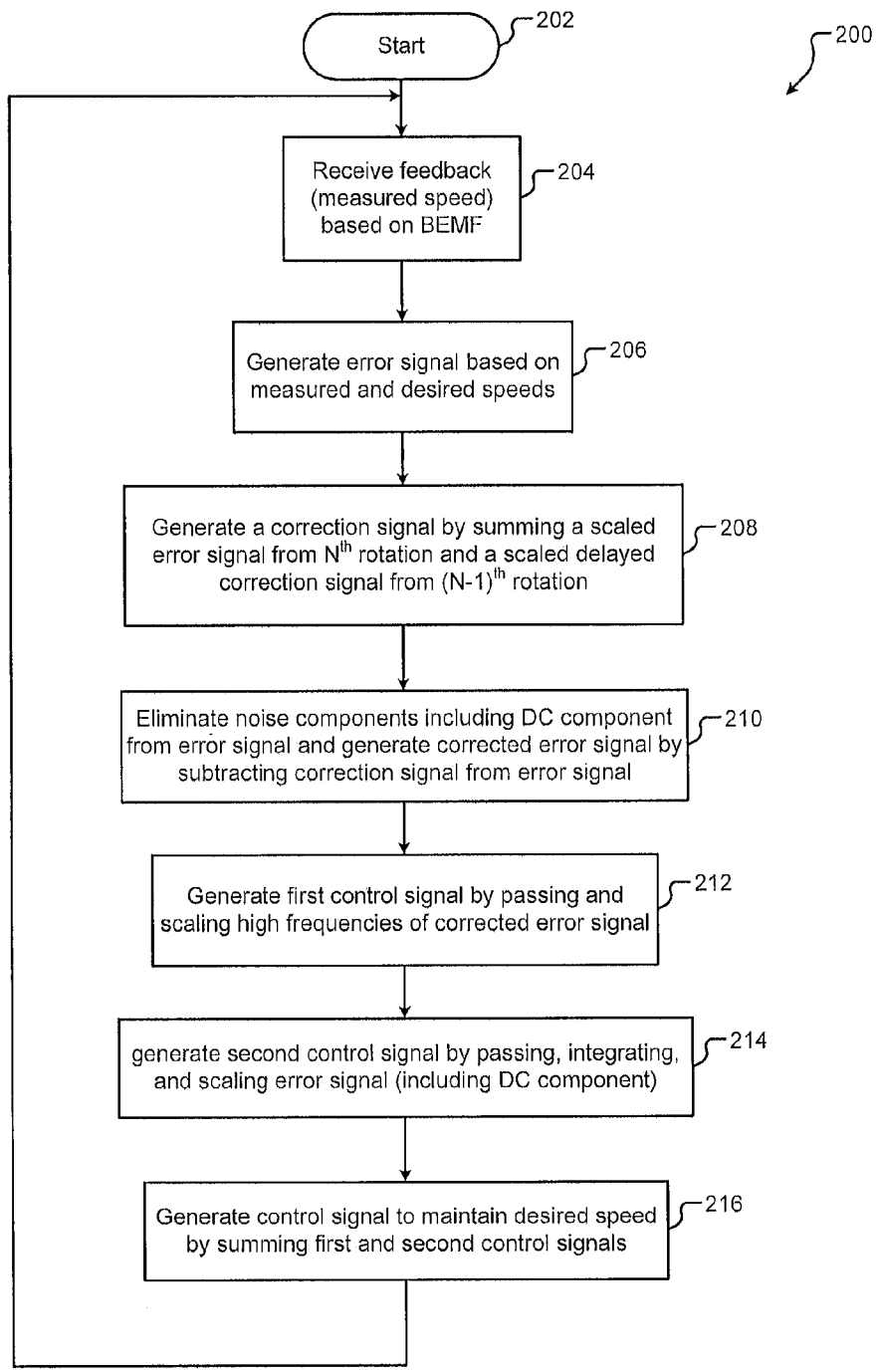
FIG. 5B is a flowchart of a method for compensating noise pole mismatch using feedback.

Referring now to FIG. 5B, a method 200 for compensating noise due to pole mismatch using feedback according to the present disclosure begins in step 202. Control receives feedback (i.e., measured speed) based on BEMF in step 204. Control generates the error signal based on the measured and desired speed in step 206. In step 208, control generates a correction signal based by summing a scaled error signal from an $N^{th}$ rotation of the spindle motor and a scaled delayed correction signal from an $(N-1)^{th}$ rotation of the spindle motor. In step 210, control generates the corrected error signal by subtracting the correction signal from the error signal, thereby eliminating noise components including the DC component of the error signal from the error signal.

In step 212, control generates a first control signal by passing and scaling high-frequency components of the corrected error signal. In step 214, control generates a second control signal by passing, integrating, and scaling low-frequency components including the DC component of the uncorrected or raw error signal. In step 216, control generates the control signal to maintain the speed of the spindle motor at the desired speed by summing the first and second control signals. Control repeats steps 204 through 216 to maintain the speed of the spindle motor at the desired speed.

Referring now to FIGS. 6A and 6B, exemplary frequency characteristics of a transfer function $C_{cor}(z)$ of the repetitive compensation module 142 are shown. In FIG. 6A, a gain characteristic is shown. In FIG. 6B, a phase characteristic is shown. The transfer function $C_{cor}(z)$ has a gain of approximately 0 dB at the rotation frequency $X_1=60$ Hz, at the harmonics of the rotation frequency $X_2=120$ Hz, $X_3=180$ Hz, and at the frequency of the DC component $X_4<10^0$ Hz. At other frequencies, the gain of the transfer function $C_{cor}(z)$ is less than 0 dB. Accordingly, the repetitive compensation module 142 can pass the noise component at the specified frequencies of the error signal $\omega_{err}$. The repetitive compensation module 142 can also pass the non-noise component, which is the DC component, of the error signal $\omega_{err}$.

Referring now to FIGS. 7A and 7B, exemplary frequency characteristics of a transfer function $C_{rep}(z)$ of the noise eliminating module 126 are shown. In FIG. 7A, a gain characteristic is shown. In FIG. 7B, a phase characteristic is shown. The transfer function $C_{rep}(z)$ has a very low gain at the rotation frequency $X_1=60$ Hz, at the harmonics of the rotation frequency $X_2=120$ Hz, $X_2=180$ Hz, . . . , etc., and at the frequency of the DC component $X_4<10^0$ Hz. At other frequencies, the gain of the transfer function $C_{rep}(z)$ is approximately 0 dB. Accordingly, the noise eliminating module 126 can eliminate the noise component at the specified frequencies of the error signal $\omega_{err}$. The noise eliminating module 126 can also eliminate the non-noise component, which is the DC component, of the error signal $\omega_{err}$.

Figure 8:
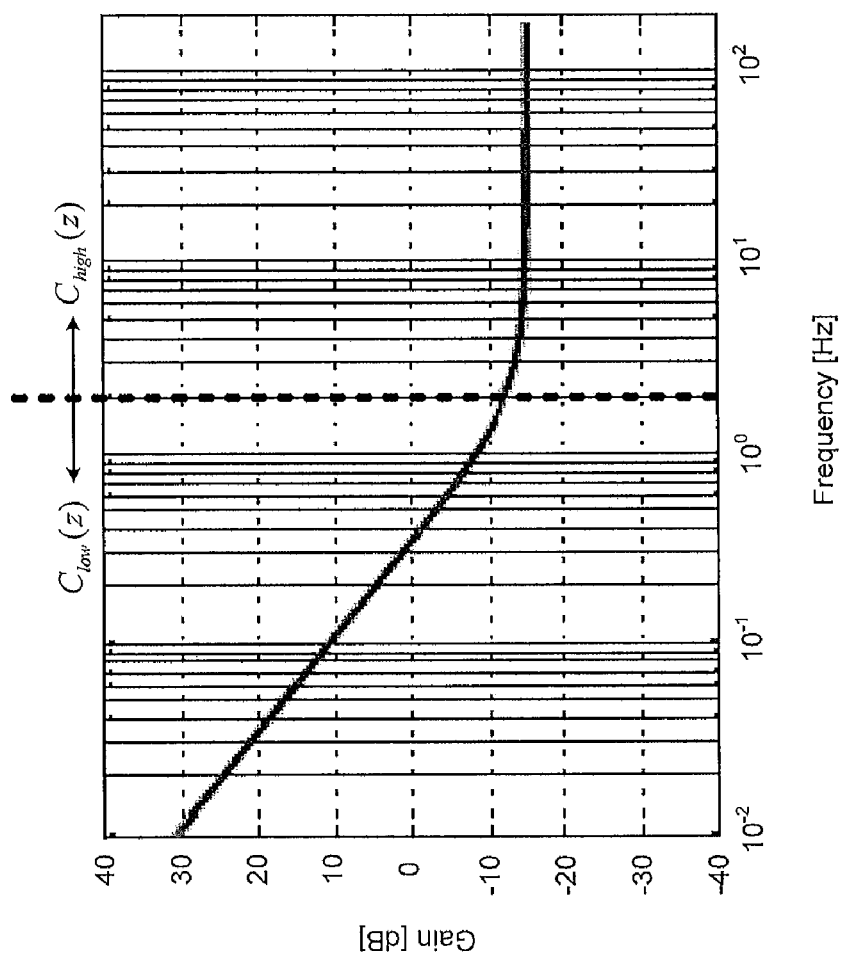
FIG. 8 is an exemplary frequency characteristic of the control module of FIG. 5A.

Referring now to FIG. 8, an exemplary frequency characteristic of the control module 128 is shown. The first control module 162 functions as a proportional controller that generates the first internal control signal $U_P$ by multiplying the corrected error signal $\omega^*_{err}$ by a proportionality constant $K_p$. In other words, the transfer function of the first control module 162 is expressed by the equation $C_{high}(z)=K_p$. The second control module 164 functions as an integrator that generates the second internal control signal $U_I$ by integrating the error signal $\omega_{err}$ and multiplying the result by the proportionality constant $K_i$. In other words, the transfer function of the second control module 164 is expressed by the equation $C_{low}(z)=K_i/(1+z^{-1})$.

The gain of the transfer function $C_{low}(z)$ of the second control module 164 is greater than the gain of the transfer function $C_{high}(z)$ of the first control module 162 in the low frequency band, which includes frequencies less than or equal to $10^0$ Hz. In contrast, the gain of the transfer function $C_{high}(z)$ of the first control module 162 is greater than the gain of the transfer function $C_{low}(z)$ of the second control module 164 in the high frequency band, which includes frequencies greater than $10^0$ Hz.

Accordingly, the control module 128 can generate the control signal U, wherein the second internal control signal $U_I$ is dominant in the low frequency band, and wherein the first internal control signal $U_P$ is dominant in the high frequency band. In other words, the control module 128 can generate the control signal U that, in the low frequency band, corresponds to the components generated by passing the error signal $\omega_{err}$ and eliminating the corrected error signal $\omega^*_{err}$. Additionally, the control module 128 can generate the control signal U that, in the high frequency band, corresponds to the components generated by eliminating the error signal $\omega_{err}$ and passing the corrected error signal $\omega^*_{err}$.

Referring now to FIGS. 9A and 9B, exemplary frequency characteristics of a transfer function $C_{all}(z)$ of the speed control module 120 are shown. In FIG. 9A, a gain characteristic is shown. In FIG. 9B, a phase characteristic is shown. The transfer function $C_{all}(z)$ has a high gain in the low frequency band, which includes frequencies less than or equal to $10_0$ Hz. The transfer function $C_{all}(z)$ has a gain that remains relatively constant at approximately −14 dB in the high frequency band, which includes frequencies greater than $10_0$ Hz. Furthermore, the transfer function $C_{all}(z)$ has a very low gain at the rotation frequency 60 Hz and the harmonics of the rotation frequency 120 Hz, 180 Hz, . . . , etc. Accordingly, the speed control module 120 can use feedback to control the noise caused by the pole mismatch (e.g., the noise at 60 Hz, 120 Hz, 180 Hz, . . . , etc.).

Figure 10:
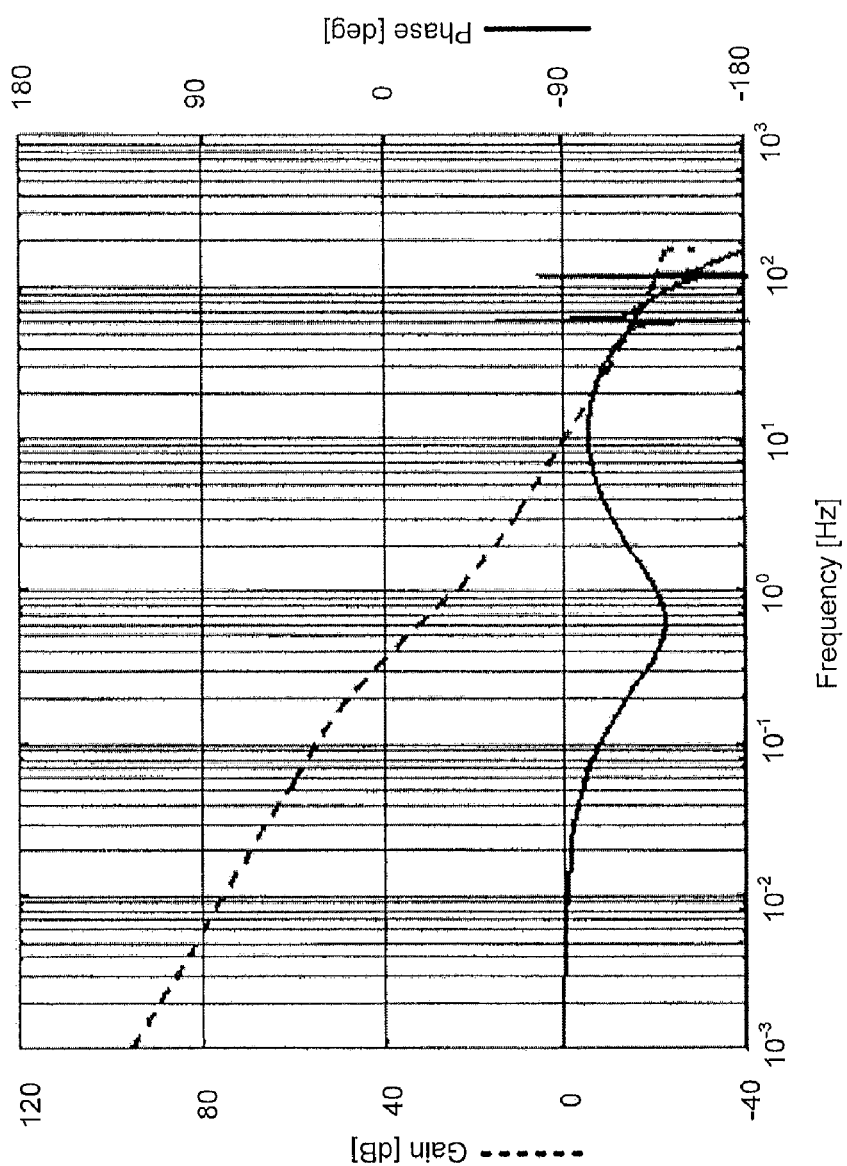
FIG. 10 depicts an open loop characteristic when a speed control system having the characteristics of FIGS. 9A and 9B is used to control the speed of the HDD of FIG. 1.

Referring now to FIG. 10, open-loop characteristics of a control system are shown. The open-loop characteristics are observed when a control system having the characteristics of FIGS. 9A and 9B is used to control the speed of the spindle motor 18, wherein a reference rotation frequency is set to 60 Hz.

Next, experimental results obtained using the speed control module 120 are compared to experimental results obtained without using the speed control module 120. The experimental results are obtained using the following settings: The first proportionality constant $(1-K_{rep})$ of the repetitive compensation module 142 is set to 0.01. The second proportionality constant $K_{rep}$ of the repetitive compensation module 142 is set to 0.99. The proportionality constant $K_p$ of the first control module 162 is set to 1.75600. The proportionality constant $K_i$ of the second control module 164 is set to 0.006238.

Figure 11B:
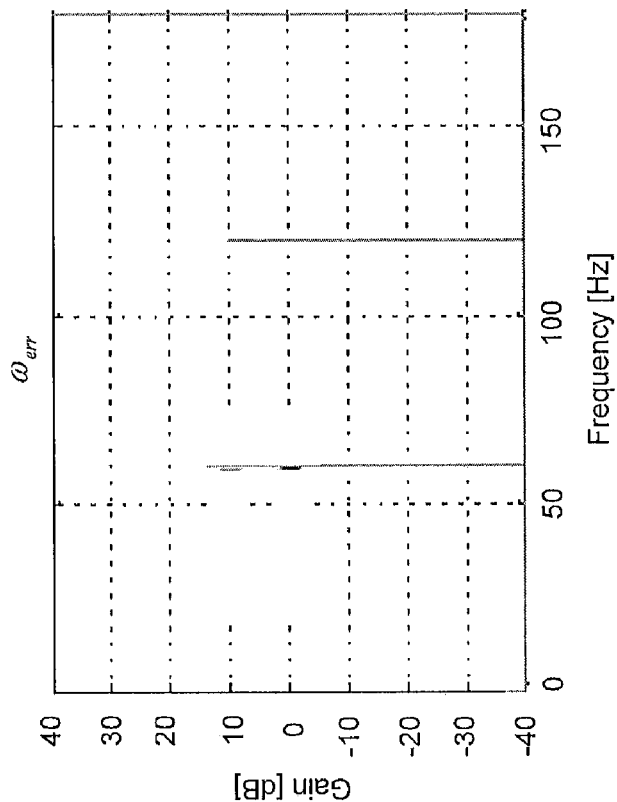
FIGS. 11A and 11B depict experimental results of a correction signal $\omega_{err}$ when the speed control module of FIG. 3 is not used.
Figure 11A:
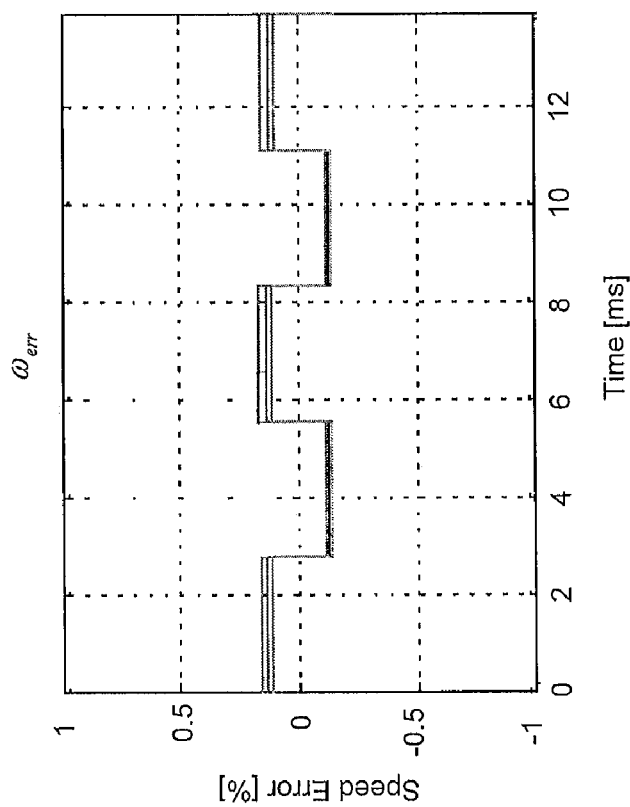
Figure 12B:
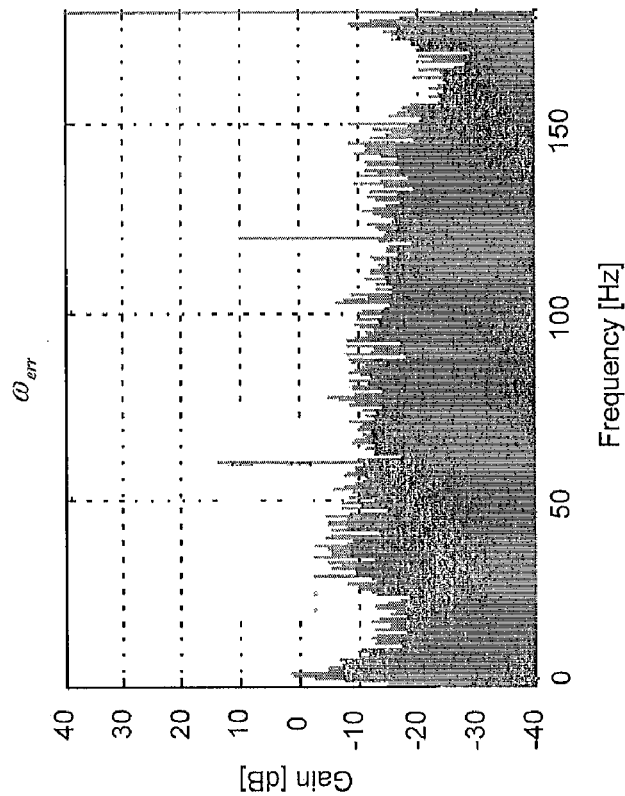
FIGS. 12A and 12B depict experimental results of the correction signal $\omega_{err}$ when the speed control module of FIG. 3 is not used.
Figure 12A:
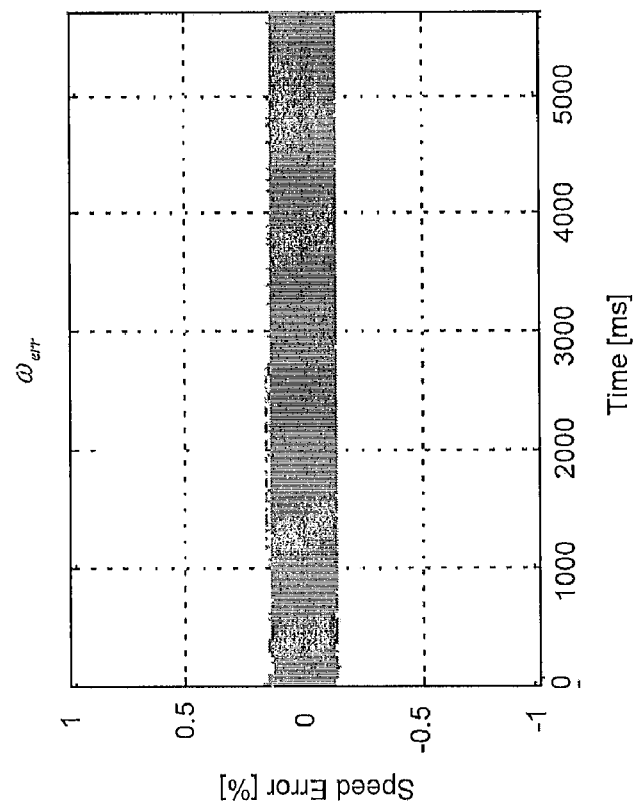

FIGS. 11A-12B illustrate the experimental results for the error signal $\omega_{err}$ obtained when the speed control module 120 is not used. In FIGS. 11A and 11B, the speed error at each BEMF detection position is shown. In FIGS. 12A and 12B, the time response of the speed error is shown. In FIGS. 11A and 12A, the error signal $\omega_{err}$ is shown in time domain. In FIGS. 11B and 12B, the error signal $\omega_{err}$ is shown in frequency domain. According to the experimental results, the error signal $\omega_{err}$ expressed as a percentage had a maximum value of 0.1683%, a minimum value of −0.1440%, and a standard deviation of 0.1311%. The gain of the error signal $\omega_{err}$ at 60 Hz and 120 Hz was approximately 10 dB.

Figure 13B:
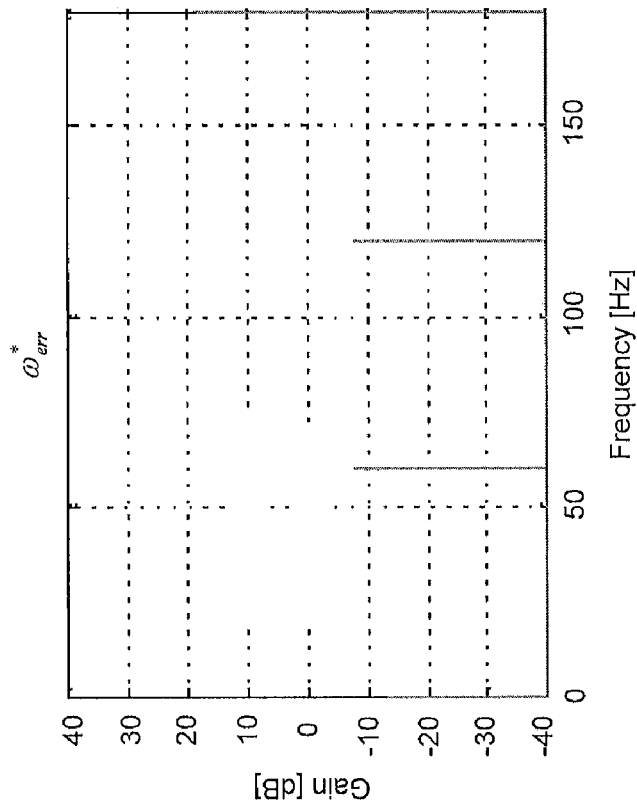
FIGS. 13A and 13B depict experimental results of a corrected error signal $\omega^*_{err}$ generated by the noise eliminating module of FIG. 4.
Figure 13A:
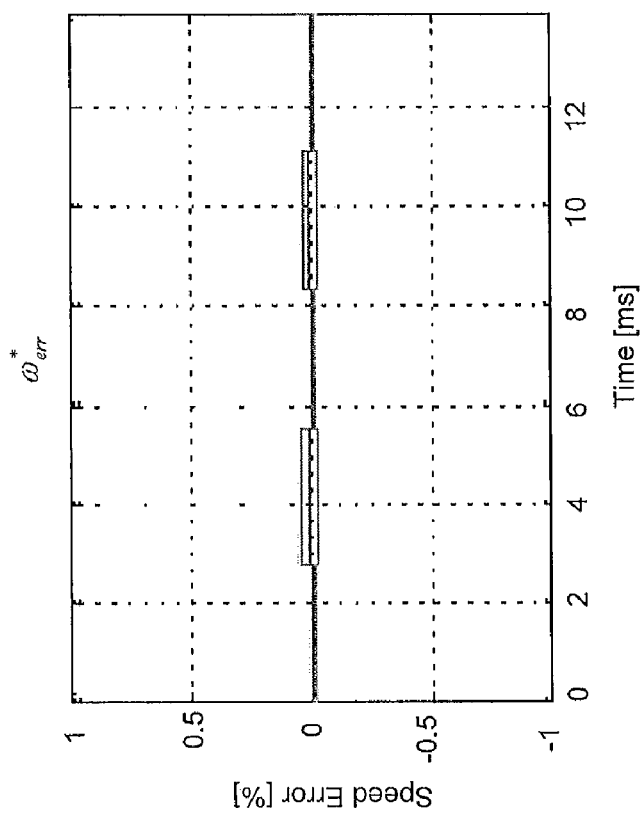
Figures 14A, 14B, 14C:
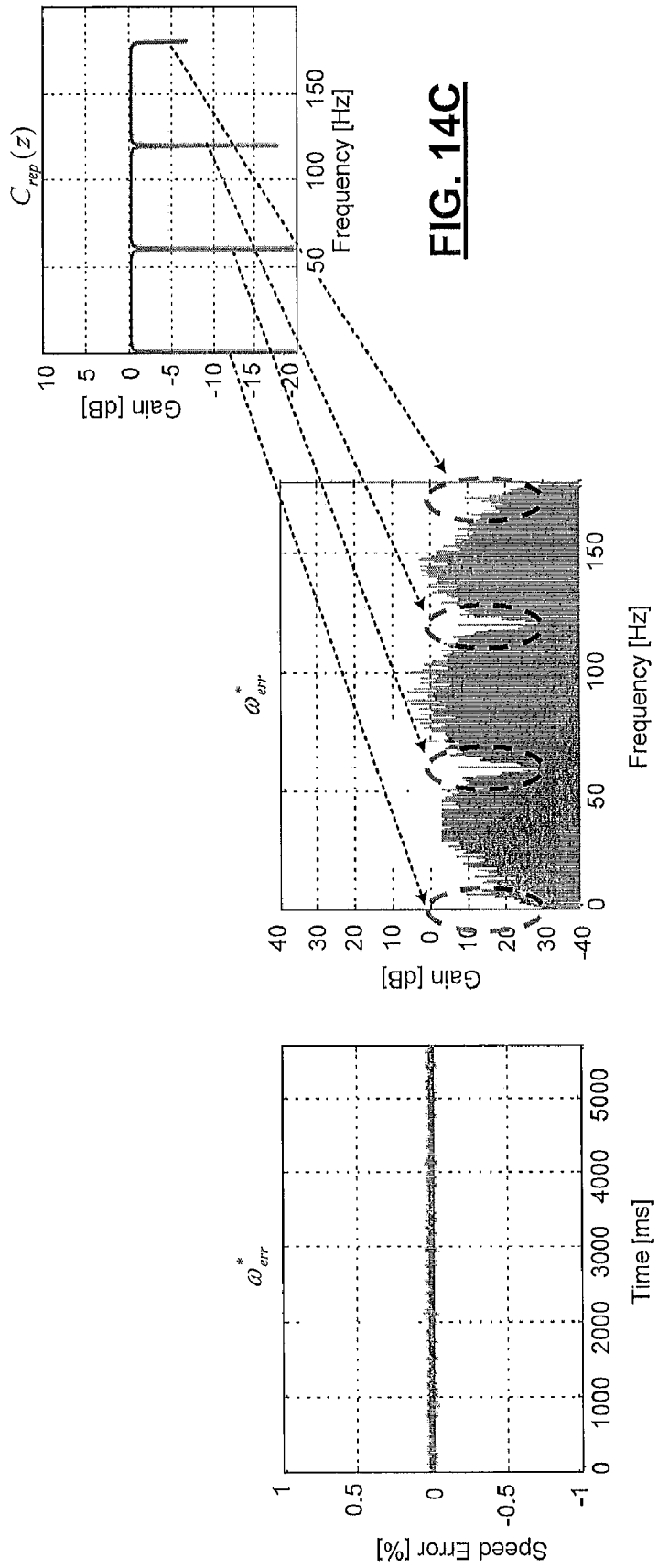
FIGS. 14A-14C depict experimental results of the corrected error signal $\omega^*_{err}$.

FIGS. 13A-14C illustrate experimental results of the corrected error signal $\omega^*_{err}$ obtained when the speed control module 120 is used. In FIGS. 13A and 13B, the corrected speed error at each BEMF detection position is shown. In FIGS. 14A, 14B, and 14C, time response of the corrected speed error is shown. In FIGS. 13A and 14A, the corrected error signal $\omega^*_{err}$ is shown in the time domain. In FIGS. 13B and 14B, the corrected error signal $\omega^*_{err}$ is shown in the frequency domain. In FIG. 14C, a frequency characteristic of the transfer function $C_{rep}(z)$ of the noise eliminating module 126 is shown.

According to the experimental results, the corrected error signal $\omega^*_{err}$ expressed as a percentage had a maximum value of 0.0549%, a minimum value of −0.0297%, and a standard deviation of 0.0119%. The gain of the corrected error signal $\omega^*_{err}$ at 60 Hz and 120 Hz was approximately −9 dB. As shown in FIGS. 14B and 14C, the frequency characteristic of the corrected error signal $\omega^*_{err}$ indicates that the gain of the corrected error signal $\omega^*_{err}$ takes small values according to the frequency characteristic of the transfer function $C_{rep}(z)$. Thus, the noise eliminating module 126 can generate the corrected error signal $\omega^*err$, wherein the components at frequencies that are integer multiples of the rotation frequency are decreased by approximately 19 dB.

Figure 15B:
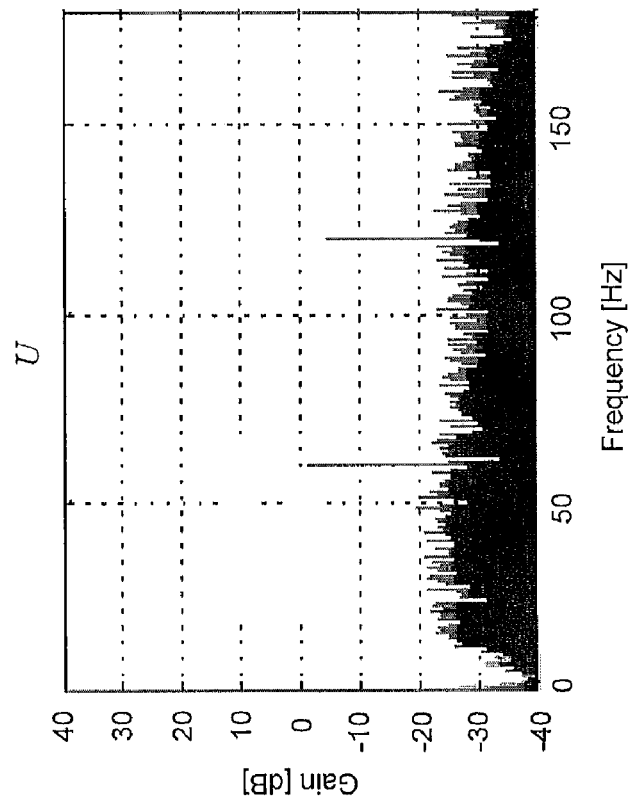
FIGS. 15A and 15B depict experimental results of a control signal U when the speed control module of FIG. 3 is not used.
Figure 15A:
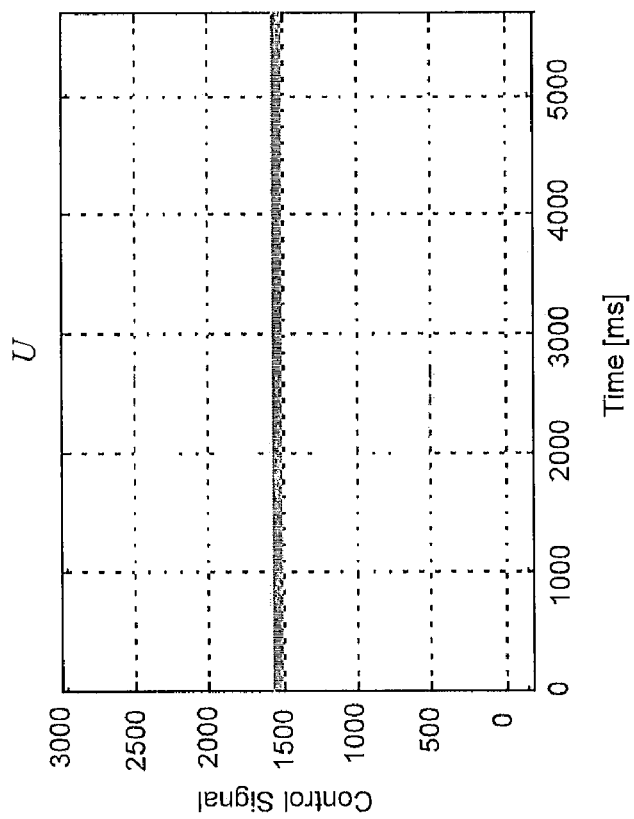

FIGS. 15A and 15B illustrate experimental results of the control signal U obtained when the speed control module 120 is not used. In FIG. 15A, the control signal U is shown in the time domain. In FIG. 15B, the control signal U is shown in the frequency domain. According to the experimental results, when the speed control module 120 is not used, the control signal U had a maximum value of 1563.0, a minimum value of 1506.0, and a standard deviation of 25.9. The gain of the control signal U was approximately −1 dB at 60 Hz and approximately −4 dB at 120 Hz.

FIGS. 16A, 16B, and 16C illustrate experimental results of the control signal U obtained when the speed control module 120 is used are shown. In FIG. 16A, the control signal U is shown in the time domain. In FIG. 16B, the control signal U is shown in the frequency domain. In FIG. 16C, a frequency characteristic of the transfer function $C_{rep}(z)$ of the noise eliminating module 126 is shown.

According to the experimental results, when the speed control module 120 is used, the control signal U had a maximum value of 1533.0, a minimum value of 1516.0, and a standard deviation of 2.8. The gain of the control signal U was approximately −20 dB at 60 Hz and approximately −19 dB at 120 Hz. As shown in FIGS. 16B and 16C, the frequency characteristic of the control signal U indicates that the gain of the control signal U takes small values according to the frequency characteristic of the transfer function $C_{rep}(z)$.

Thus, the speed control module 120 can decrease the components in the control signal U at frequencies that are integer multiples of the rotation frequency by approximately 19 dB relative to when the speed control module 120 is not used. Since the speed control module 120 can decrease the variation in the target variable caused by the pole mismatch, the noise is decreased so that the target variable can accurately conform to the desired value.

In sum, the speed control module 120 compensates the noise due to pole mismatch and controls the speed of the spindle motor 18 using feedback as follows. The first control module 162 generates a high-frequency control command $U_P$ to control the speed of the spindle motor 18 based on the corrected error signal $\omega^*_{err}$ generated by the noise eliminating module 126. The noise eliminating module 126 generates the corrected error signal $\omega^*_{err}$ by performing repetitive compensation. The second control module 164 generates a low-frequency control command $U_I$ to control the speed of the spindle motor 18 based on the uncorrected error signal $\omega_{err}$ generated by the error signal generating module 124. The error signal generating module 124 generates the uncorrected error signal $\omega_{err}$ based on the detection signal (i.e., feedback) received from the spindle driver module 110 and the desired speed. The control module 128 generates a control command U by adding $U_P$ and $U_I$. The spindle driver module 110 drives the spindle motor 18 at the desired speed based on the control command U.

In other words, the first control module 162 generates a proportional term $U_P$ for compensating high frequency errors due to pole mismatch. The first control module 162 generates the proportional term based on the corrected error signal $\omega^*_{err}$, which is without the harmonic components that are synchronous to the rotation frequency and without the DC component of the rotation frequency. The second control module 164 generates an integral term $U_I$ for compensating low frequency errors due to pole mismatch. The second control module 164 generates the integral term based on the raw or the uncorrected error signal $\omega_{err}$, which includes the DC component of the rotation frequency. Thus, the control command U, which is the sum of the proportional term and the integral term, is compensated for noise due to the pole mismatch, and the speed of the spindle motor is controlled at the desired speed despite the pole mismatch.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   an error signal generating module configured to generate an error signal based on (i) back electromotive force sensed from a motor and (ii) a predetermined speed of the motor, wherein the error signal includes noise due to mismatched poles of the motor;
   a noise elimination module configured to
      eliminate components of the noise having frequencies N times a frequency of rotation of the motor from the error signal, and
      generate a corrected error signal, where N is an integer greater than or equal to zero; and
   a control module configured to
      generate a first control signal based on components of the corrected error signal,
      generate a second control signal based on components of the error signal, and rotate the motor at the predetermined speed based on (i) the first control signal and (ii) the second control signal,
wherein the components of the corrected error signal have higher frequencies than the components of the error signal.

2. The system of claim 1, wherein the noise elimination module is configured to:
generate a correction signal based on the error signal, and
generate the corrected error signal by subtracting the correction signal from the error signal.

3. The system of claim 2, wherein the noise elimination module is configured to:
generate a first scaled signal by scaling the error signal,
generate a delayed signal by delaying the correction signal,
generate a second scaled signal by scaling the delayed signal, and
generate the correction signal by summing the first scaled signal and the second scaled signal.

4. The system of claim 1, wherein the control module is configured to generate the first control signal by (i) filtering the components of the error signal and (ii) scaling the components of the corrected error signal.

5. The system of claim 1, wherein the control module is configured to generate the second control signal by (i) filtering the components of the corrected error signal and (ii) passing the components of the error signal including a direct current (DC) current component of the error signal.

6. The system of claim 1, wherein the control module is configured to generate the second control signal by (i) integrating the error signal and (ii) scaling the integrated error signal.

7. The system of claim 1, wherein the control module comprises:
a high-pass filter configured to
pass the components of the corrected error signal, and
generate the first control signal; and
a low-pass filter configured to
pass the components of the error signal including a direct current (DC) component of the error signal, and
generate the second control signal.

8. The system of claim 7, wherein:
the high-pass filter has a higher gain than the low-pass filter at frequencies of the components of the corrected error signal; and
the low-pass filter has a higher gain than the high-pass filter at frequencies of the components of the error signal.

9. A rotating storage device comprising:
a controller that comprises the system of claim 1; and
the motor,
wherein the motor is configured to rotate a storage medium of the rotating storage device at the predetermined speed.

10. A method comprising:
generating an error signal based on (i) back electromotive force sensed from a motor and (ii) a predetermined speed of the motor, wherein the error signal includes noise due to mismatched poles of the motor;
generating a corrected error signal by eliminating components of the noise having frequencies N times a frequency of rotation of the motor from the error signal, where N is an integer greater than or equal to zero;
generating a first control signal based on components of the corrected error signal;
generating a second control signal based on components of the error signal, wherein the components of the corrected error signal have higher frequencies than the components of the error signal; and
rotating the motor at the predetermined speed based on (i) the first control signal and (ii) the second control signal.

11. The method of claim 10 further comprising:
generating a correction signal based on the error signal; and
generating the corrected error signal by subtracting the correction signal from the error signal.

12. The method of claim 11 further comprising:
generating a first scaled signal by scaling the error signal;
generating a delayed signal by delaying the correction signal;
generating a second scaled signal by scaling the delayed signal; and
generating the correction signal by summing the first scaled signal and the second scaled signal.

13. The method of claim 10 further comprising generating the first control signal by (i) filtering the components of the error signal and (ii) scaling the components of the corrected error signal.

14. The method of claim 10 further comprising generating the second control signal by (i) filtering the components of the corrected error signal and (ii) passing the components of the error signal including a direct current (DC) current component of the error signal.

15. The method of claim 10 further comprising generating the second control signal by (i) integrating the error signal and (ii) scaling the integrated error signal.

16. The method of claim 10 further comprising:
generating the first control signal by passing the components of the corrected error signal using a high-pass filter; and
generating the second control signal by passing the components of the error signal including a direct current (DC) component of the error signal using a low-pass filter,
wherein the high-pass filter has a higher gain than the low-pass filter at frequencies of the components of the corrected error signal, and
wherein the low-pass filter has a higher gain than the high-pass filter at frequencies of the components of the error signal.

17. The method of claim 10 further comprising:
controlling a rotating storage device comprising the motor; and
rotating a storage medium of the rotating storage device at the predetermined speed using the motor.

* * * * *